(12) United States Patent
Ito et al.

(10) Patent No.: US 9,166,519 B2
(45) Date of Patent: Oct. 20, 2015

(54) MOTOR CONTROL DEVICE

(75) Inventors: Masato Ito, Tokyo (JP); Yoshihiko Kinpara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 13/978,562

(22) PCT Filed: Jan. 25, 2011

(86) PCT No.: PCT/JP2011/051266
§ 371 (c)(1),
(2), (4) Date: Jul. 8, 2013

(87) PCT Pub. No.: WO2012/101753
PCT Pub. Date: Aug. 2, 2012

(65) Prior Publication Data
US 2013/0285588 A1 Oct. 31, 2013

(51) Int. Cl.
*G01R 31/34* (2006.01)
*H02P 27/00* (2006.01)
*H02P 31/00* (2006.01)
*H02P 23/00* (2006.01)
*H02P 23/14* (2006.01)
*H02P 27/08* (2006.01)

(52) U.S. Cl.
CPC ............ *H02P 31/00* (2013.01); *H02P 23/0068* (2013.01); *H02P 23/14* (2013.01); *H02P 27/085* (2013.01)

(58) Field of Classification Search
None
See application file for complete search history.

(56) References Cited

U.S. PATENT DOCUMENTS 6,570,358 B2  5/2003  Nakatsugawa et al.
7,317,292 B2 * 1/2008  Iura et al. ............ 318/434

FOREIGN PATENT DOCUMENTS

| JP | 7 244099 | 9/1995 |
|---|---|---|
| JP | 2002 95289 | 3/2002 |
| JP | 2002 335699 | 11/2002 |
| JP | 2002335699 A | * 11/2002 |
| JP | 2004 72821 | 3/2004 |
| JP | 2004 187460 | 7/2004 |
| JP | 2004187460 A | * 7/2004 |
| JP | 2007 228767 | 9/2007 |

OTHER PUBLICATIONS

Combined Taiwanese Office Action and Search Report issued Dec. 9, 2013, in Taiwanese Patent Application No. 100147082 with partial English translation and with English translation of category of cited documents.
International Search Report Issued May 10, 2011 in PCT/JP11/051266 Filed Jan. 25, 2011.
Chinese Office Action dated Feb. 27, 2015 in corresponding Chinese patent application No. 201180065829.1 with partial English translation (10 pages).

* cited by examiner

*Primary Examiner* — Eduardo Colon Santana
*Assistant Examiner* — Cortez Cook
(74) *Attorney, Agent, or Firm* — Oblon, McClelland, Maier & Neustadt, L.L.P.

(57) ABSTRACT

A motor control device includes: a frequency instruction setting section for outputting a plurality of frequency instructions; an AC voltage instruction generation section for generating and outputting an AC voltage instruction based on each of the frequency instructions; a voltage application section for applying voltage to a motor based on the AC voltage instruction; a current detection section for detecting motor current flowing in the motor; and a type determination section for determining the type of the motor based on a transfer characteristic of the motor calculated from the motor current, the AC voltage instruction, and the frequency instruction.

4 Claims, 15 Drawing Sheets

MOTOR CONTROL DEVICE

TECHNICAL FIELD

The present invention relates to a control device for a motor, having means for determining the type of the motor.

BACKGROUND ART

In order to drive a motor such as an induction motor or a synchronous motor, it is necessary to recognize the type of the motor in advance before driving the motor, because a driving method differs depending on the type of the motor. Therefore, conventionally, a user recognizes the type of the motor in advance, and selects a control device and a control method in accordance with the type of the motor. However, it may be difficult to recognize the types of some motors from their appearances. Thus, a user cannot always recognize the type of the motor.

In order to solve the above problem, a method of Patent Document 1 is proposed. The method of Patent Document 1 determines the type of a motor by using the fact that the saturation degree of the motor differs depending on the type of the motor.

CITATION LIST

Patent Document

Patent Document 1: Japanese Laid-Open Patent Publication No. 2002-095289

SUMMARY OF THE INVENTION

Problems to be Solved by the Invention

The method of Patent Document 1 determines the type of a motor based on the saturation degree of the motor. For example, in the case of an induction motor, the motor type is determined by using the fact that the saturation degree of the motor is constant regardless of the rotor position of the motor, and in the case of a synchronous motor (an embedded magnet synchronous motor, a surface magnet synchronous motor, or a synchronous reluctance motor), the motor type is determined by using the fact that the saturation degree of the motor changes depending on the rotor position. However, in a synchronous motor designed such that magnetic saturation hardly occurs, the change in the saturation degree depending on the rotor position is small, so that it may be difficult to distinguish the synchronous motor from an induction motor. That is, since the saturation degree is influenced also by a motor structure besides the type of the motor, it may be difficult to determine the type of the motor by the method of determining the type of the motor from the saturation degree.

The present invention has been made to solve the above problem, and an object of the present invention is to provide a motor control device capable of determining the type of a motor by a method less influenced by a factor other than the type of the motor, such as the structure of the motor, thus improving the determination accuracy.

Solution to the Problems

A motor control device according to the present invention includes: a frequency instruction setting section for outputting a plurality of frequency instructions; an AC voltage instruction generation section for generating and outputting an AC voltage instruction based on each of the frequency instructions; a voltage application section for applying voltage to a motor based on the AC voltage instruction; a current detection section for detecting motor current flowing in the motor; and a type determination section for determining the type of the motor based on a transfer characteristic of the motor calculated from the motor current, the AC voltage instruction, and the frequency instruction.

Effect of the Invention

The motor control device according to the present invention includes: a frequency instruction setting section for outputting a plurality of frequency instructions; an AC voltage instruction generation section for generating and outputting an AC voltage instruction based on each of the frequency instructions; a voltage application section for applying voltage to a motor based on the AC voltage instruction; a current detection section for detecting motor current flowing in the motor; and a type determination section for determining the type of the motor based on a transfer characteristic of the motor calculated from the motor current, the AC voltage instruction, and the frequency instruction. Therefore, the motor control device according to the present invention can determine the type of a motor based on a transfer characteristic less influenced by a factor other than the type of the motor, such as the structure of the motor, thus improving the determination accuracy for the motor type.

DESCRIPTION OF EMBODIMENTS

Embodiment 1

Figure 1:
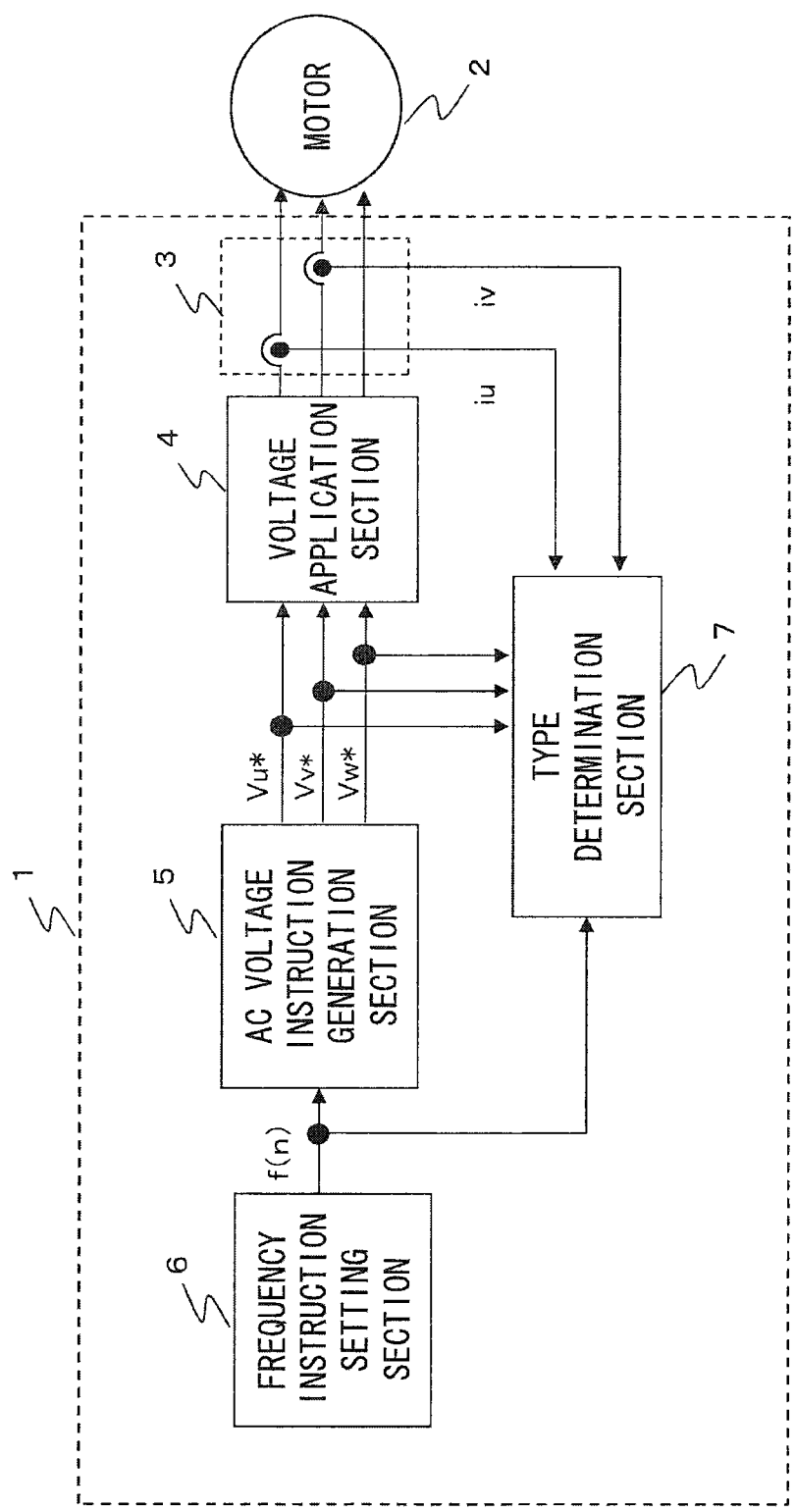
FIG. 1 is a configuration diagram according to a motor control device of embodiment 1 of the present invention.
Figure 2:
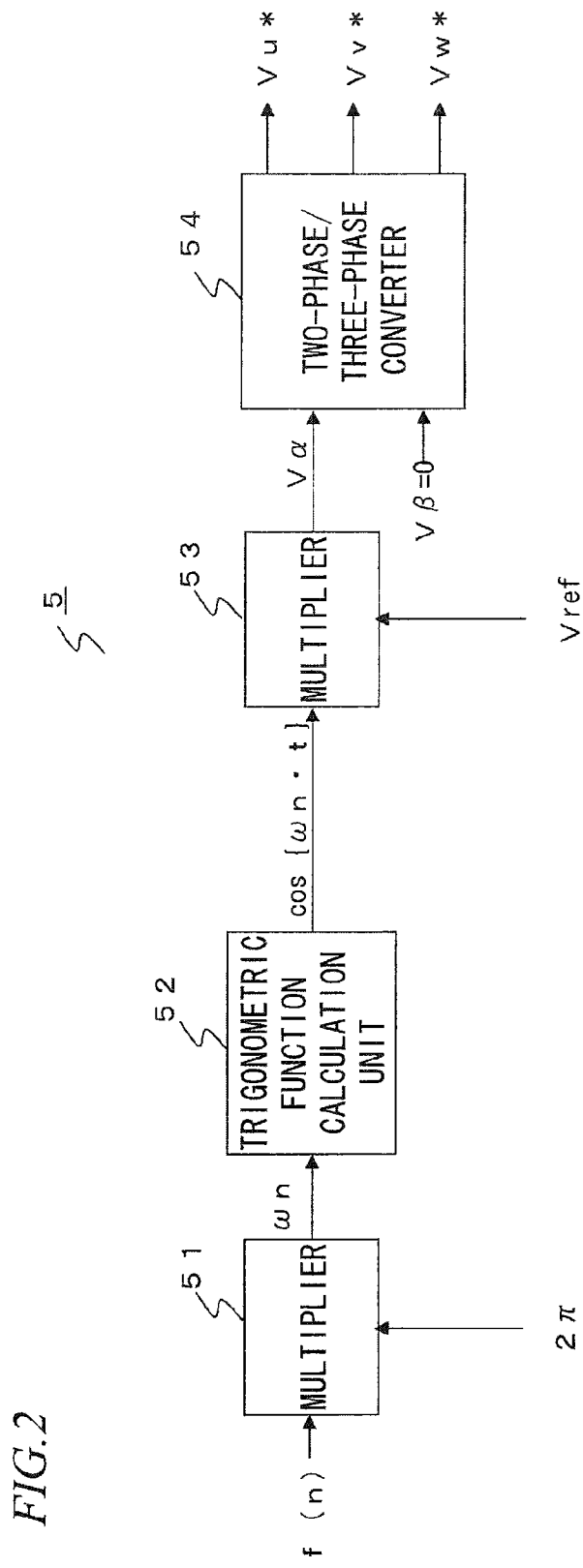
FIG. 2 is a detailed configuration diagram according to the motor control device of embodiment 1 of the present invention.
Figure 3:
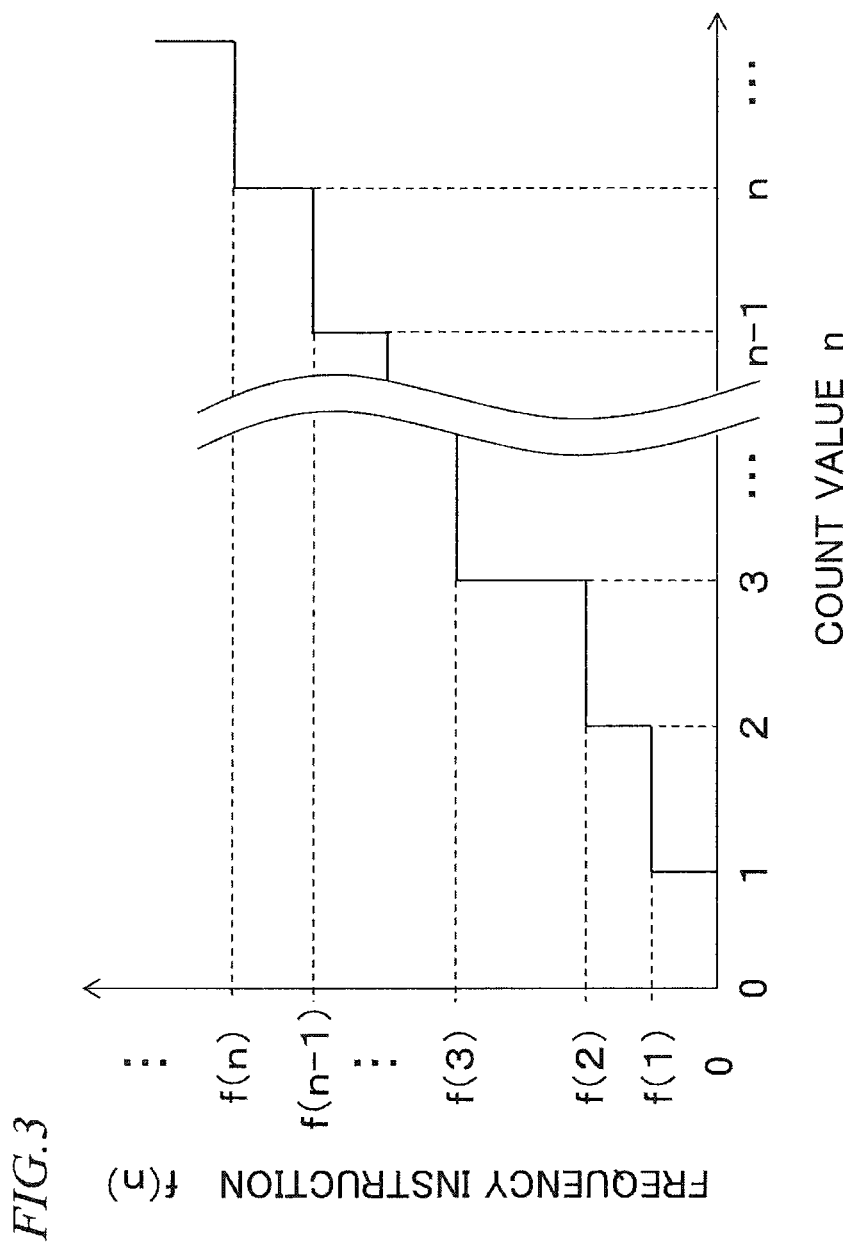
FIG. 3 is a function explanation diagram according to the motor control device of embodiment 1 of the present invention.
Figure 5:
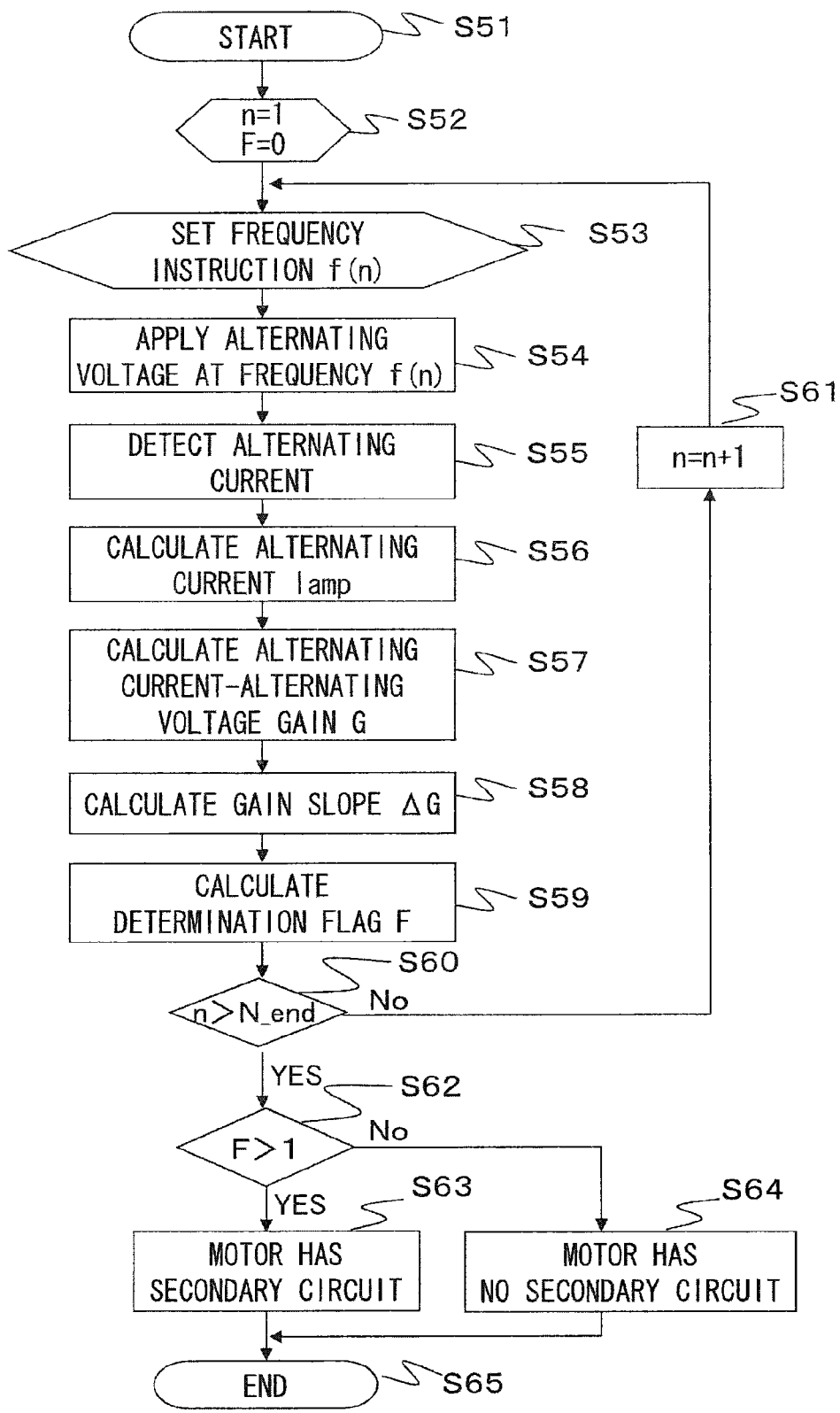
FIG. 5 is a flowchart for explaining a process according to the motor control device of embodiment 1 of the present invention.
Figure 6:
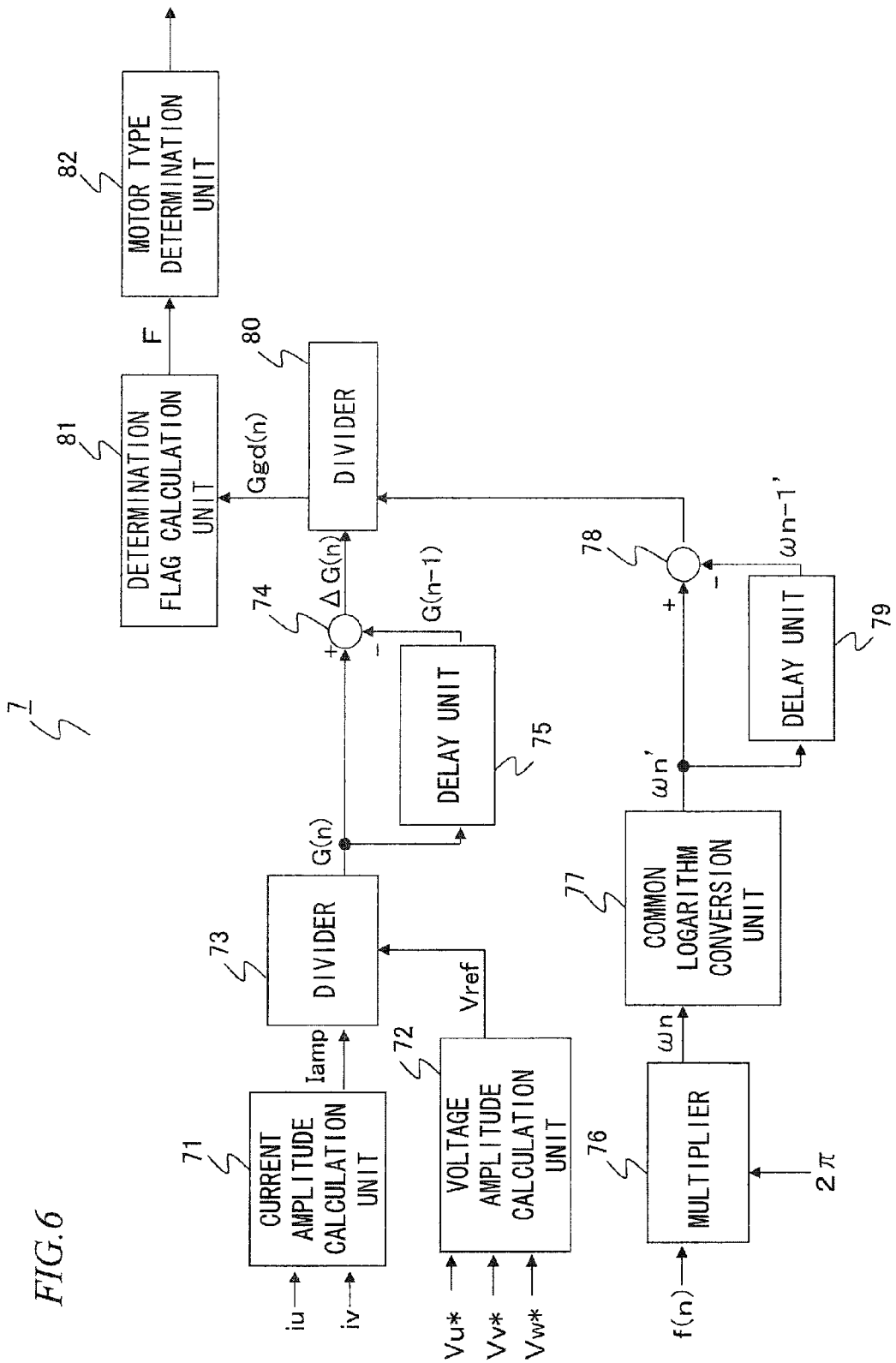
FIG. 6 is a detailed configuration diagram according to the motor control device of embodiment 1 of the present invention.
Figure 7:
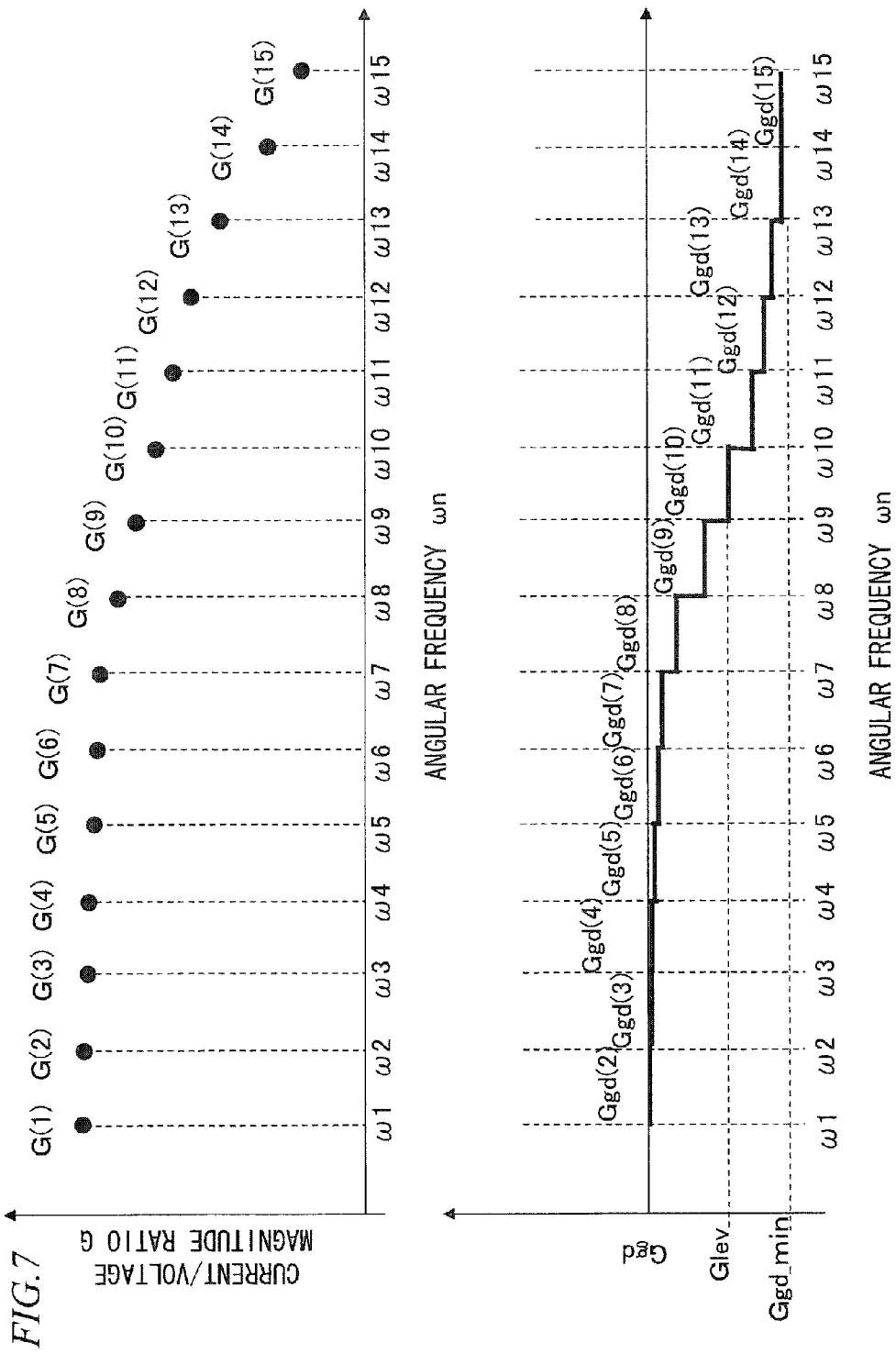
FIG. 7 is a function explanation diagram according to the motor control device of embodiment 1 of the present invention.
Figure 8:
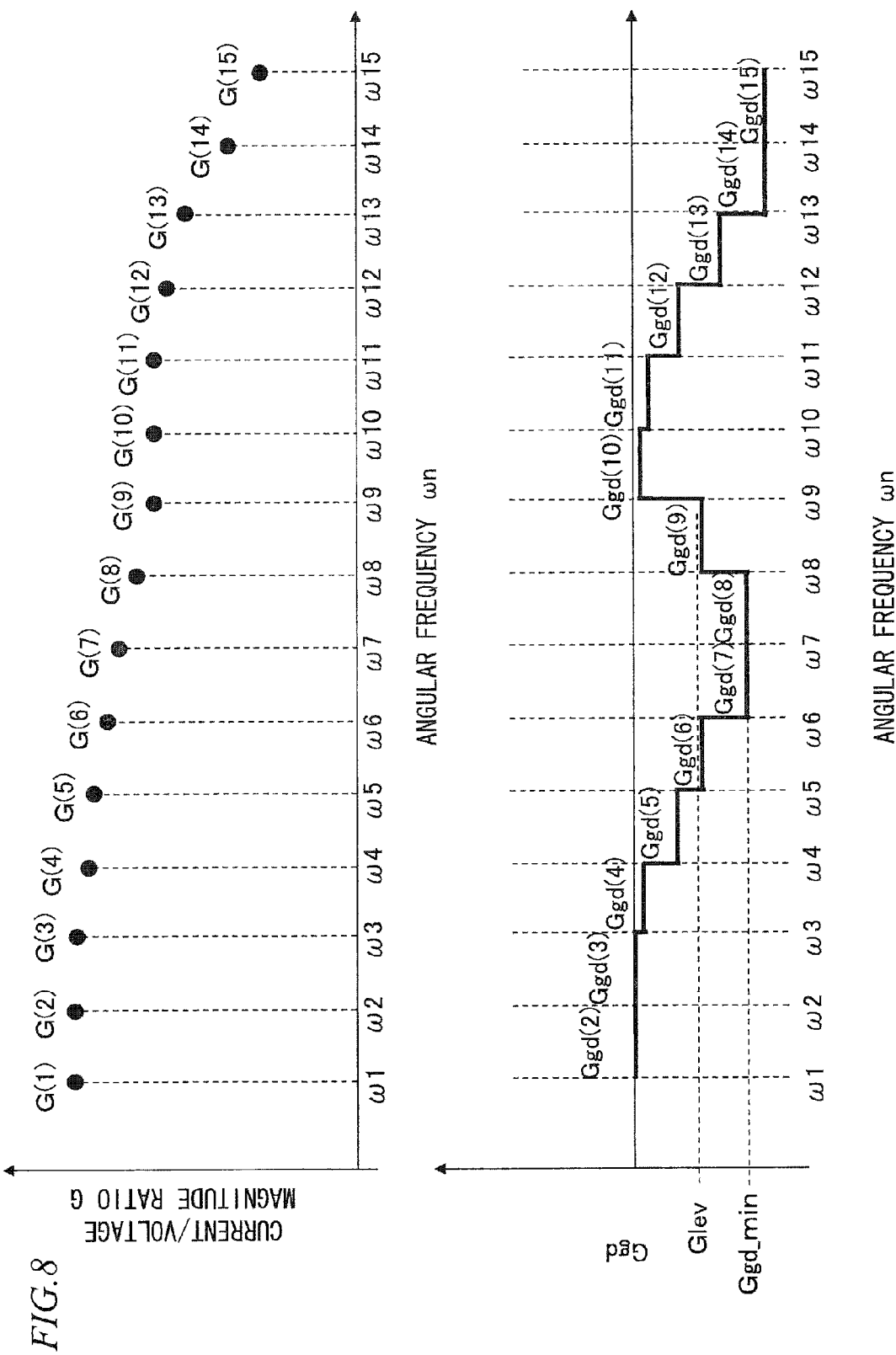
FIG. 8 is a function explanation diagram according to the motor control device of embodiment 1 of the present invention.
Figure 9:
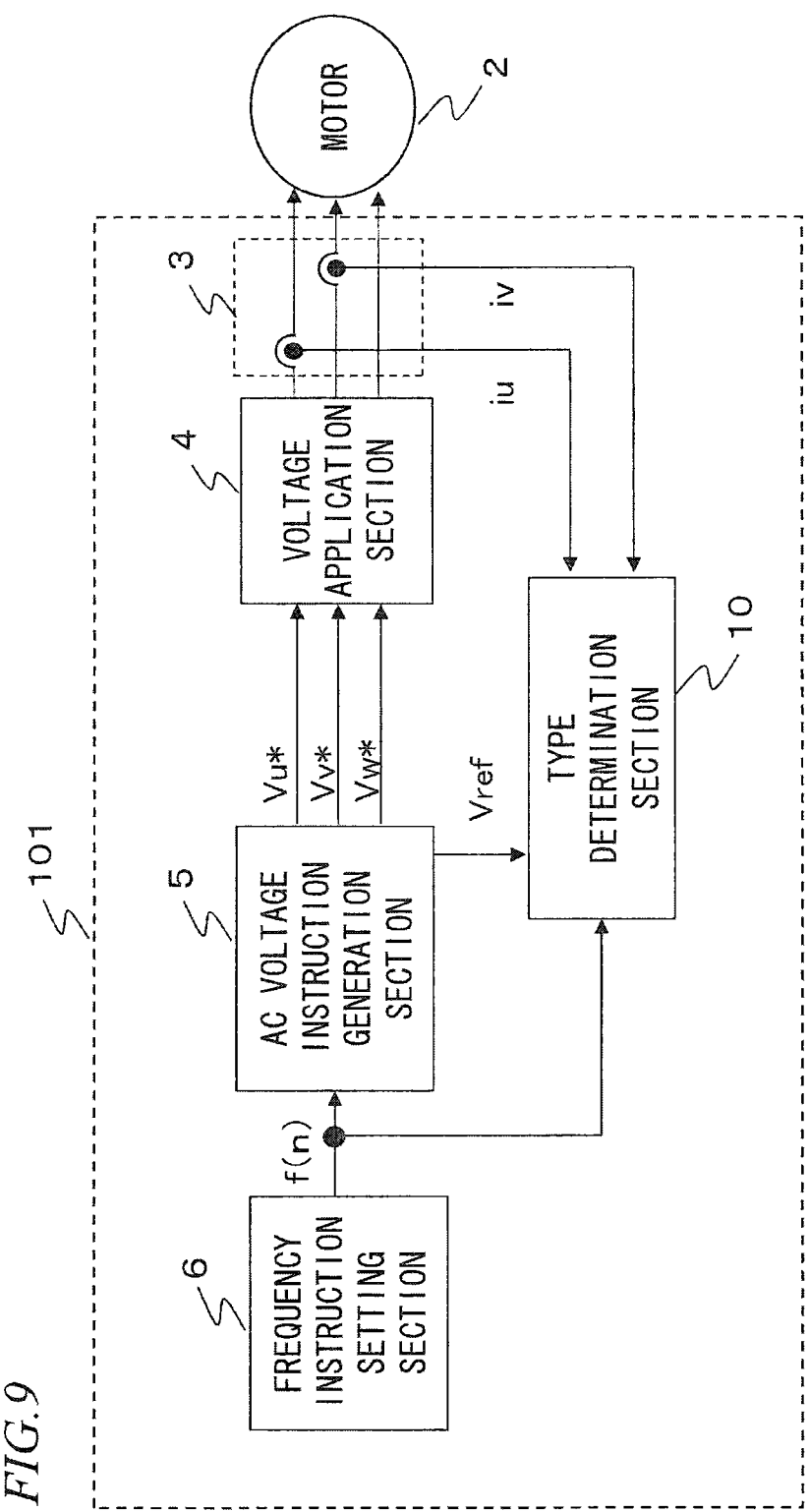
FIG. 9 is another configuration diagram according to the motor control device of embodiment 1 of the present invention.
Figure 10:
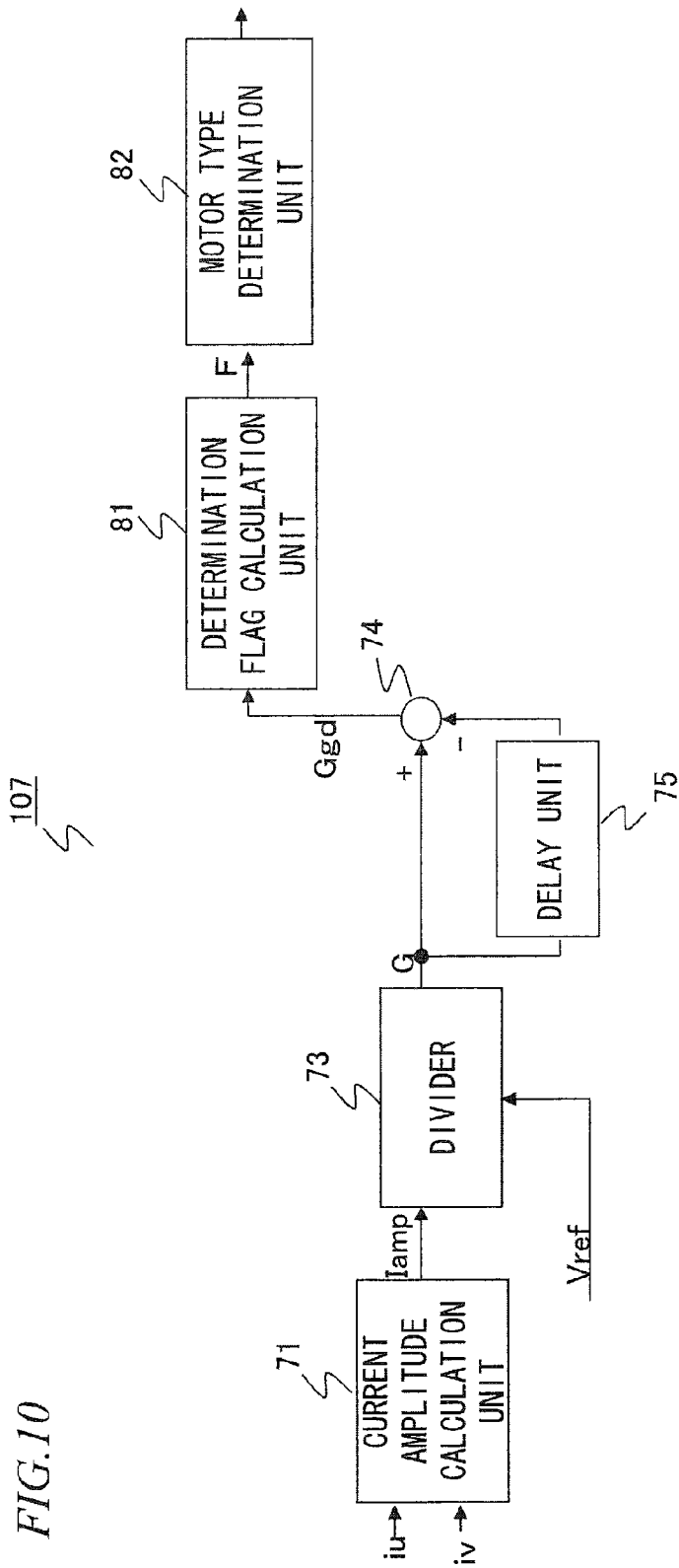
FIG. 10 is another detailed configuration diagram according to the motor control device of embodiment 1 of the present invention.

Hereinafter, embodiment 1 of the present invention will be described based on the drawings. FIG. 1 is a diagram showing the hardware configuration of a motor control device 1 according to embodiment 1 of the present invention, FIG. 2 is a detailed configuration diagram, FIGS. 3 and 4 are function explanation diagrams, FIG. 5 is a flowchart for explaining a process, FIG. 6 is a detailed configuration diagram, and FIGS. 7 and 8 are function explanation diagrams. In addition, FIGS. 9 and 10 are configuration diagrams showing a modification according to embodiment 1 of the present invention.

Hereinafter, the configuration of the motor control device 1 according to embodiment 1 of the present invention will be described based on FIG. 1.

In embodiment 1, a motor 2 driven by the motor control device 1 is an AC motor. The motor control device 1 includes: a voltage application section 4 for applying voltage to the motor 2; a current detection section 3 for detecting motor current flowing between the voltage application section 4 and the motor 2; an AC voltage instruction generation section 5 for giving an AC voltage instruction to the voltage application section 4; a frequency instruction setting section 6 for giving a frequency instruction f to the AC voltage instruction generation section 5; and a type determination section 7 for calculating the transfer characteristic of the motor from the AC voltage instruction, the frequency instruction, and the motor current and determining the type of the motor.

In FIG. 1, the current detection section 3 detects u-phase current and v-phase current. However, any combination of two phases other than the combination of u-phase and v-phase may be detected. Instead, u-phase, v-phase, and w-phase may be all detected.

The voltage application section 4 is a semiconductor power converter, and applies AC voltage to the motor 2 based on an AC voltage instruction outputted by the AC voltage instruction generation section 5.

FIG. 2 is a detailed configuration diagram of the AC voltage instruction generation section 5.

A multiplier 51 multiplies a frequency instruction f(n) by $2\pi$, to obtain an angular frequency instruction $\omega n$. A trigonometric function calculation unit 52 outputs a cosine function $\cos(\omega n \cdot t)$ based on the angular frequency instruction $\omega n$. Here, the trigonometric function outputted by the trigonometric function calculation unit 52 may be either a cosine function $\cos(\omega n \cdot t)$ or a sine function $\sin(w n \cdot t)$. In embodiment 1, the case of outputting the cosine function $\cos(\omega n \cdot t)$ will be described below.

A multiplier 53 multiplies the cosine function $\cos(\omega n \cdot t)$ outputted by the trigonometric function calculation unit 52, by a voltage instruction amplitude Vref which is a give constant value, thereby outputting $Vref \cdot \cos(\omega n \cdot t)$. A two-phase/three-phase converter 54 performs two-phase/three-phase conversion for an $\alpha$-axis voltage instruction $V\alpha$ and a $\beta$-axis voltage instruction $V\beta$ which are voltage instructions on two axes at rest, in accordance with expression (1), thereby outputting AC voltage instructions Vu*, Vv*, and Vw*.

[Expression 1]

$$\begin{bmatrix} Vu^* \\ Vv^* \\ Vw^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} V\alpha \\ V\beta \end{bmatrix} \quad (1)$$

In embodiment 1, $V\alpha$ is $Vref \cdot \cos(\omega n \cdot t)$ outputted by the multiplier 53, and $V\beta=0$ is given. Therefore, an AC voltage instruction outputted by the AC voltage instruction generation section 5 is alternating voltage in which the direction of the vector of voltage changes between two directions.

It is noted that the AC voltage instruction calculated by expression (1) using $V\beta=Vref \cdot \cos(\omega n \cdot t)$ and $V\alpha=0$ may be given.

In addition, $V\alpha$ and $V\beta$ may be set so as to obtain rotational voltage in which the direction of the voltage vector changes among three or more directions. In embodiment 1, the case of giving $V\alpha$ and $V\beta$ so as to obtain alternating voltage will be described.

Hereinafter, as used in the present invention, alternating voltage (current) is defined as voltage (current) in which the voltage (current) vector changes between two directions, e g, 0 degree and 180 degrees.

With reference to a function explanation diagram in FIG. 3, the function of the frequency instruction setting section 6 will be described.

The frequency instruction setting section 6 sets and outputs a plurality of different frequency instructions. In embodiment 1, as shown in FIG. 3, the frequency instruction setting section 6 sets, as a frequency instruction f(n), n different frequency instructions from f(1) to f(n), and sequentially outputs them in accordance with a count value n.

Next, with reference to a function explanation diagram in FIG. 4, the operation of the type determination section 7 will be described in detail.

The type determination section 7 calculates a transfer characteristic from the alternating voltage of the motor 2 to the motor current by using motor currents iu and iv, AC voltage instructions Vu*, Vv*, and Vw*, and a frequency instruction f(n), and determines the type of the motor by the transfer characteristic.

Specifically, the motor type is determined depending on a motor having a circuit (hereinafter, referred to as a secondary circuit) in which current flows in a rotor, such as an induction motor or an induction synchronous motor, and a motor not having a secondary circuit, such as a permanent magnet synchronous motor or a synchronous reluctance motor.

Figure 4A:
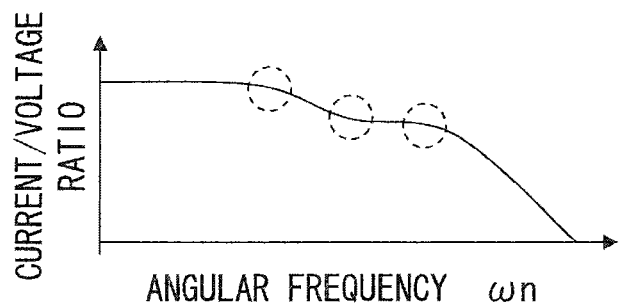
FIG. 4 is a function explanation diagram according to the motor control device of embodiment 1 of the present invention.
Figure 4B:
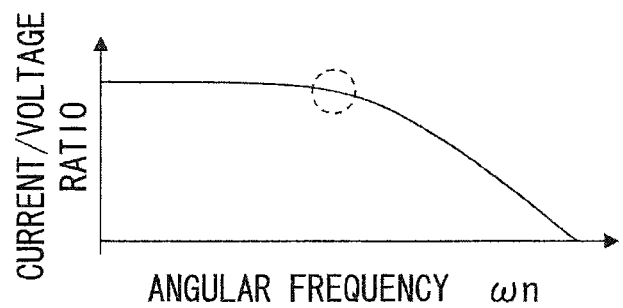

FIG. 4(a) shows an example of the transfer characteristic of an induction motor, and FIG. 4(b) shows an example of the transfer characteristic of a permanent magnet synchronous motor. It is noted that an angular frequency of the horizontal axis in FIG. 4 is indicated as common logarithm converted from an angular frequency.

In embodiment 1, as shown in FIG. 4, a frequency characteristic (hereinafter, referred to as a magnitude plot) of the ratio (gain) between the magnitude of alternating voltage and the magnitude of motor current, obtained by dividing the magnitude of motor current by the magnitude of alternating voltage, is used as a transfer characteristic.

As shown in FIG. 4, a magnitude plot is different between a motor (induction motor) having a secondary circuit and a motor (permanent magnet motor) not having a secondary circuit.

Specifically, in a motor having a secondary circuit shown in FIG. 4(a), since the motor has a secondary circuit, the transfer function of the motor is a second-order system. Therefore, there are three points (indicated by dotted circles) where the slope of the gain changes on the magnitude plot. On the other hand, in a motor not having a secondary circuit shown in FIG. 4(b), since the transfer function thereof is a first-order system, there is only one point where the slope of the gain changes.

Owing to such a feature, if there is one point where the slope of the gain changes on the magnitude plot, the motor can be determined to be a motor not having a secondary circuit, and if there are two or more points where the slope of the gain changes, the motor can be determined to be a motor having a secondary circuit.

Accordingly, in embodiment 1, the slope of the gain is calculated, and the type of a motor is determined based on the slope of the gain.

Hereinafter, a specific method for the determination will be described.

FIG. 5 is a flowchart for explaining a motor type determination process according to the motor control device of embodiment 1.

When the process is started (S51), the initial value n=1 and a determination flag F=0 described later are set (S52). Next, in accordance with the count value n (the initial value=1), the frequency instruction f(n) is set (S53).

It is noted that the frequency instruction f at the count value n is denoted by f(n), and the value of the frequency instruction corresponding to each count value is set in advance.

Next, alternating voltage at the frequency instruction f(n) is applied to the motor (S54). As described above, the alternating voltage is generated by the voltage application section 4, based on the AC voltage instruction outputted from the AC voltage instruction generation section 5, and then applied to the motor 2. When the alternating voltage is applied, alternating current flows in the motor 2, and the alternating current is detected by the current detection section 3 (S55).

Next, a magnitude Iamp of the alternating current is calculated (S56), and a gain G(n) which is the ratio between the magnitude of the alternating current and the magnitude of the alternating voltage at the count value n is calculated (S57). Next, a slope Ggd(n) of the gain is calculated (S58).

Next, the determination flag F described later in detail is calculated (S59).

If the count value n is equal to or smaller than a count maximum value N_end set in advance (S60), the count value is set to be n+1 by adding 1 to the count value n (S61). Thereafter, steps S53 to S60 are repeated until the count value n becomes larger than the count maximum value N_end.

If the count value n is larger than the count maximum value, it is determined whether the motor is a motor having a secondary circuit or a motor not having a secondary circuit, based on the value of the determination flag F (S62 to S64), and then the process is ended (S65).

FIG. 6 is a detailed configuration diagram of the type determination section 7, in which the above-described calculation of the magnitude Iamp of the alternating current, the magnitude Vref of the alternating voltage, the gain G, and the slope Ggd of the gain, and the above-described motor type determination, are performed.

A current amplitude calculation unit 71 calculates and outputs the alternating current amplitude Iamp by expression (2) using the motor currents iu and iv outputted by the current detection section 3.

[Expression 2]

$$Iamp = \sqrt{\frac{4(iu^2 + iv^2 + iu \cdot iv)}{3}} \quad (2)$$

A voltage amplitude calculation unit 72 calculates the magnitude Vref of the AC voltage instruction by expression (3) using Vu*, Vv*, and Vw* outputted by the AC voltage instruction generation section 5.

[Expression 3]

$$Vref = \sqrt{\frac{2(Vu^{*2} + Vv^{*2} + Vw^{*2})}{3}} \quad (3)$$

A divider 73 divides the alternating current amplitude Iamp by the magnitude Vref of the AC voltage instruction, thereby calculating and outputting the gain G. A delay unit 75 outputs the gain G(n−1) obtained at the count value n−1, i.e., one count before the present count value.

An adder-subtractor 74 subtracts the gain G(n−1) one count before, outputted by the delay unit 75, from the gain G(n) outputted by the divider 73, thereby outputting a difference ΔG(n) of the gain. A multiplier 76 multiplies the frequency instruction f(n) outputted by the frequency instruction setting section 6 by 2π, thereby outputting the angular frequency ωn. A common logarithm conversion unit 77 converts the angular frequency ωn outputted by the multiplier 76 into a common logarithm value ωn' of the angular frequency, by expression (4).

[Expression 4]

$$\omega n' = \log_{10}(\omega n) \quad (4)$$

A delay unit 79 outputs a common logarithm value ω n−1' of the angular frequency obtained at the count value n−1, i.e., one count before the present count value. An adder-subtractor 78 subtracts the common logarithm value ωn−1' of the angular frequency one count before, outputted by the delay unit 79, from the common logarithm value ωn' of the angular frequency outputted by the common logarithm conversion unit 77, thereby outputting a difference Δωn' of the common logarithm value of the angular frequency.

A divider 80 divides the difference ΔG(n) of the gain outputted by the adder-subtractor 74 by the difference Δωn' of the common logarithm value of the angular frequency outputted by the adder-subtractor 78, thereby calculating the slope Ggd(n) of the gain.

Next, with reference to function explanation diagrams in FIGS. 7 and 8, the operation of a determination flag calculation unit 81 in FIG. 6, that is, the operation of the calculation of the determination flag F (S59) of the flowchart in FIG. 5 will be described.

The determination flag calculation unit 81 sets and outputs the determination flag F based on the slope Ggd(n) of the gain outputted by the divider 80.

FIG. 7 shows an example of the gain G(n) and the slope Ggd(n) of the gain with respect to the angular frequency ωn when the alternating voltage at the frequencies f(1) to f(n) is sequentially applied to a motor not having a secondary circuit.

FIG. 8 shows an example of the gain G(n) and the slope Ggd(n) of the gain with respect to the angular frequency ωn when the alternating voltage at the frequencies f(1) to f(n) is sequentially applied to a motor having a secondary circuit.

As shown in FIG. 7, in a motor not having a secondary circuit, the transfer function is a first-order system and there is one point where the slope of the gain changes on the magnitude plot. At low angular frequencies ($\omega 1$ to $\omega 6$ in FIG. 7), the slope Ggd of the gain is close to zero. At angular frequencies ($\omega 7$ to $\omega 15$ in FIG. 7) higher than around the point where the slope of the gain changes, the higher the angular frequency is, the smaller the slope Ggd of the gain is.

On the other hand, in a motor having a secondary circuit in FIG. 8, the transfer function is a second-order system and there are three points where the slope of the gain changes on the magnitude plot. At low angular frequencies ($\omega 1$ to $\omega 4$ in FIG. 8), the slope Ggd of the gain is close to zero.

As counted from the lowest frequency, in a range ($\omega 5$ to $\omega 8$ in FIG. 8) from around the first point where the slope of the gain changes to around the second point where the slope of the gain changes, the slope Ggd of the gain decreases. Then, in a range ($\omega 9$ to $\omega 12$ in FIG. 8) from the second point where the slope of the gain changes to around the third point where the slope of the gain changes, the slope Ggd of the gain increases again to be close to zero. At angular frequencies ($\omega 13$ to ($\omega 15$ in FIG. 8) higher than around the third point where the slope of the gain changes, the higher the angular frequency is, the smaller the slope Ggd of the gain is.

The change in the slope Ggd of the gain will be summarized as follows. In a motor not having a secondary circuit, the higher the frequency is, the smaller the slope Ggd of the gain is. On the other hand, in a motor having a secondary circuit, at first, the slope Ggd of the gain decreases as the frequency increases, and then the slope Ggd of the gain increases to be close to zero. Thereafter, the slope Ggd of the gain decreases again.

The determination, flag calculation unit 81 sets and outputs the determination flag F by using the above difference in transfer characteristic.

Hereinafter, the process of calculation of the determination flag F (S59) in FIG. 5 will be specifically described.

At the start of the entire process, the initial value of the determination flag F to be outputted by the determination flag calculation unit 81 is set at zero (S52).

While the count value is sequentially changed from 1 to n, if the slope Ggd(n) of the gain outputted by the divider 80 is smaller than the slope Ggd(n−1) of the gain one count before, the value of Ggd(n) is stored as a minimum value Ggd_min of the slope of the gain, and if the slope Ggd(n) is not smaller than the slope Ggd(n−1), Ggd_min is retained at its present value. In addition, at the same time as the setting of Ggd_min, a slope threshold value Glev of the gain is set.

Glev is set at Kg times of Ggd_min (Kg is a given value in a range of 0<Kg<1). Then, when the slope Ggd(n+1) of the gain at the next count value n+1 is compared with the slope threshold value Glev of the gain, if the slope Ggd(n+1) of the gain is larger than the slope threshold value Glev of the gain, 1 is added to the determination flag F.

In a motor not having a secondary circuit, as shown in FIG. 7, the higher the angular frequency is, the smaller the slope of the gain is. Therefore, the slope Ggd(n+1) of the gain never becomes larger than the slope threshold value Glev of the gain, so that 1 is never added to the determination flag F. That is, in a motor not having a secondary circuit, the determination flag F is 0.

Here, in FIG. 7, the values of Ggd_min and Glev of Ggd change at every point from Ggd(2) to Ggd(15), and the values of Ggd_min and Glev in the last state are shown on the graph.

On the other hand, in a motor having a secondary circuit, as shown in FIG. 8, since the slope Ggd(n+1) of the gain becomes larger than the slope threshold value Glev of the gain, 1 is added to the determination flag F. That is, in a motor having a secondary circuit, the determination flag F becomes 1.

Here, in FIG. 8, the values of Ggd_min and Glev of Ggd change at every point from Ggd(2) to Ggd(8), and do not change at Ggd(9) and later. On the graph, the values of Ggd_min and Glev in the last state are shown.

Based on the value of the determination flag F outputted by the determination flag calculation unit 81, if the determination flag F is 0, a motor type determination unit 82 determines the motor to be a motor not having a secondary circuit, and if the determination flag F is 1, determines the motor to be a motor having a secondary circuit, thereby outputting the type of the motor.

In the case where the motor as a determination target is an induction motor or a permanent magnet synchronous motor, if the determination flag F is 0, the motor type determination unit 82 determines the motor to be a permanent magnet synchronous motor. If the determination flag F is 1, the motor type determination unit 82 determines the motor to be an induction motor. Then the motor type determination unit 82 outputs the type of the motor.

As described above, in embodiment 1, the voltage amplitude calculation unit 72 in FIG. 6 has calculated the magnitude Vref of the AC voltage instruction by expression (3) from Vu*, Vv*, and Vw* outputted by the AC voltage instruction generation section 5. However, instead of calculating the magnitude of alternating voltage by expression (3), Vref may be obtained directly from the AC voltage instruction generation section 5 in FIG. 1. In this case, the voltage amplitude calculation unit 72 is not needed.

FIG. 9 shows a configuration diagram of a motor control device in the case where Vref is obtained directly from the AC voltage instruction generation section 5.

In addition, in embodiment 1, the frequency instruction f(n) for each count value n is set in advance in accordance with the count value n. However, the common logarithm value of the angular frequency may be changed at regular intervals in accordance with the count values. In this case, since $\Delta \omega'$ is constant, the slope Ggd(n) of the gain is simply proportional to only the difference $\Delta G(n)$ of the gain.

The determination of the motor type does not need the absolute value of the slope Ggd(n) of the gain but only needs to obtain a point where the slope of the gain changes. Therefore, as shown in FIG. 10, if the difference $\Delta G(n)$ of the gain is given as the slope Ggd(n) of the gain, the calculation of the difference of the common logarithm value of the angular frequency can be omitted. As a result, the configuration of the type determination section 7 of the motor control device shown in FIG. 6 can be simplified as the configuration of a type determination section 107 shown in FIG. 10.

It is noted that in the type determination section 107, Vref is obtained directly from the AC voltage instruction generation section 5.

Thus, according to embodiment 1, the motor control device 1 determines the motor type based on the transfer characteristic of the motor 2. The motor control device 1 calculates, as the transfer characteristic of the motor 2, the gain G which is a frequency characteristic of the ratio between, the magnitude of alternating voltage and the magnitude of motor current, and then obtains the slope Ggd of the gain from the calculated gain G.

Therefore, since the motor control device 1 according to embodiment 1 determines whether the motor is a motor not having a secondary circuit or a motor having a secondary circuit without using magnetic saturation of the motor, the motor control device 1 provides an effect of improving the determination accuracy.

Embodiment 2

Figure 11:
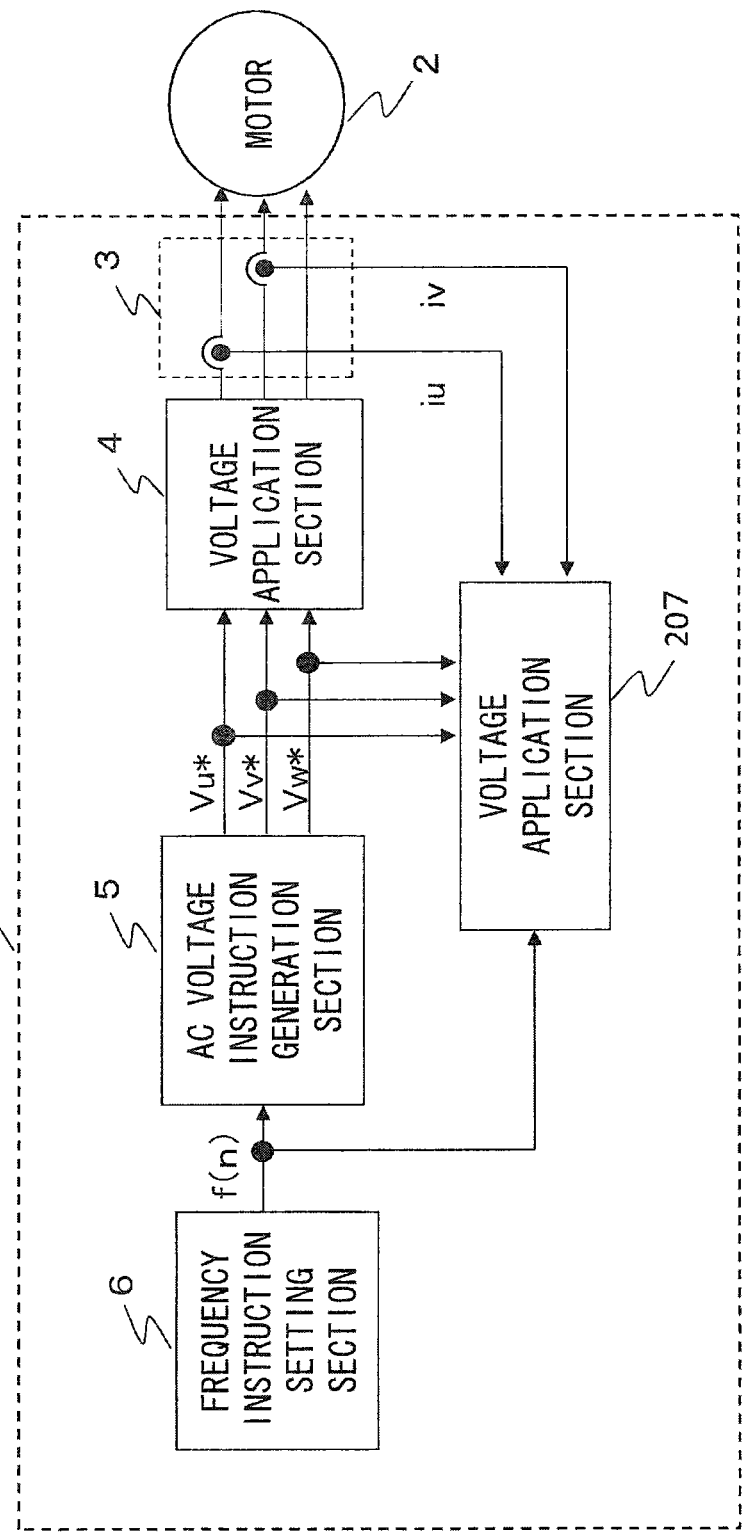
FIG. 11 is a configuration diagram according to a motor control device of embodiment 2 of the present invention.
Figure 12:
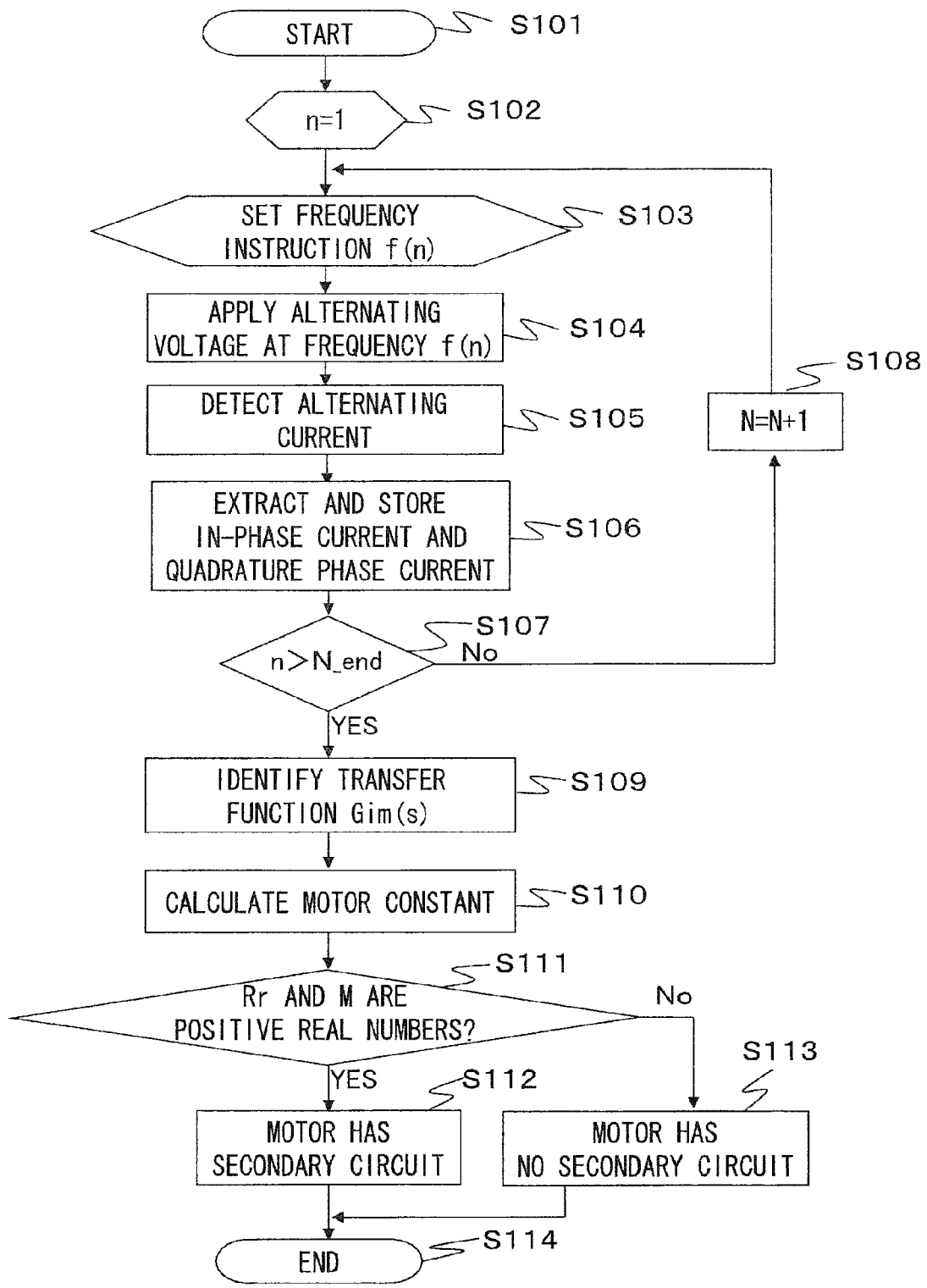
FIG. 12 is a flowchart for explaining a process according to the motor control device of embodiment 2 of the present invention.
Figure 13:
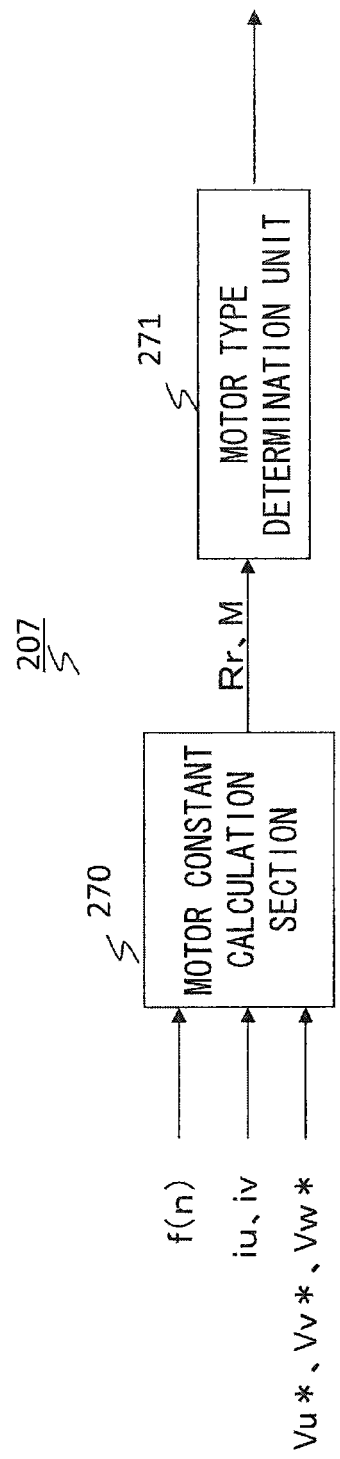
FIG. 13 is a configuration diagram according to the motor control device of embodiment 2 of the present invention.
Figure 14:
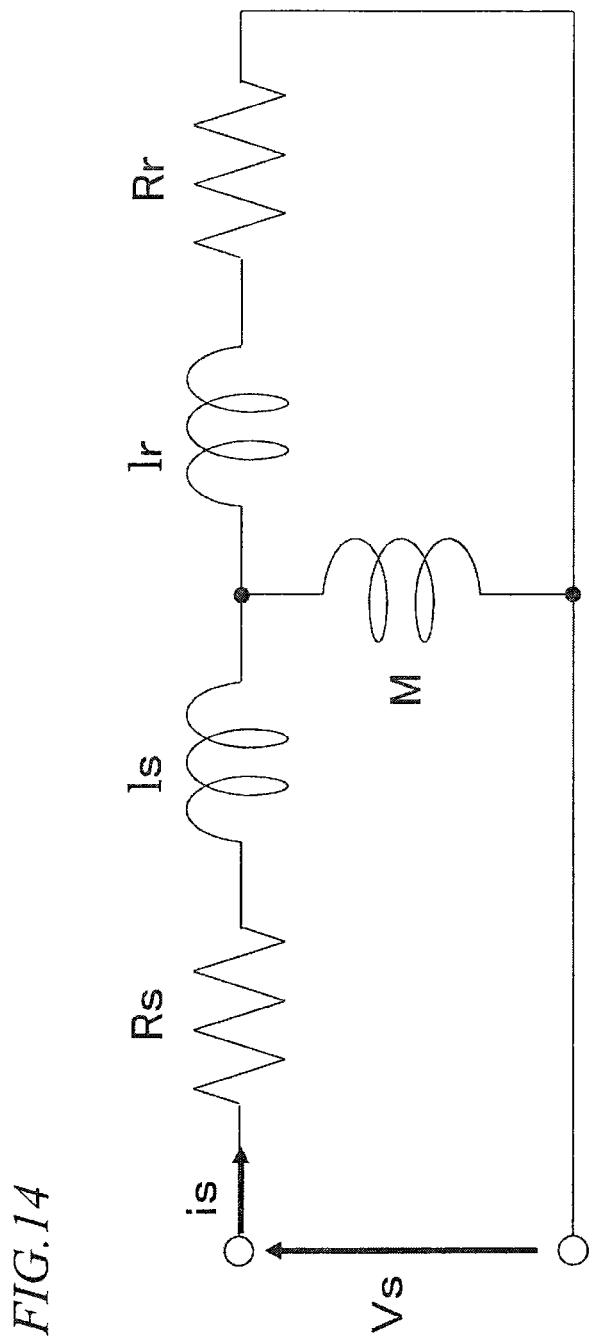
FIG. 14 is a motor equivalent circuit diagram according to the motor control device of embodiment 2 of the present invention.
Figure 15:
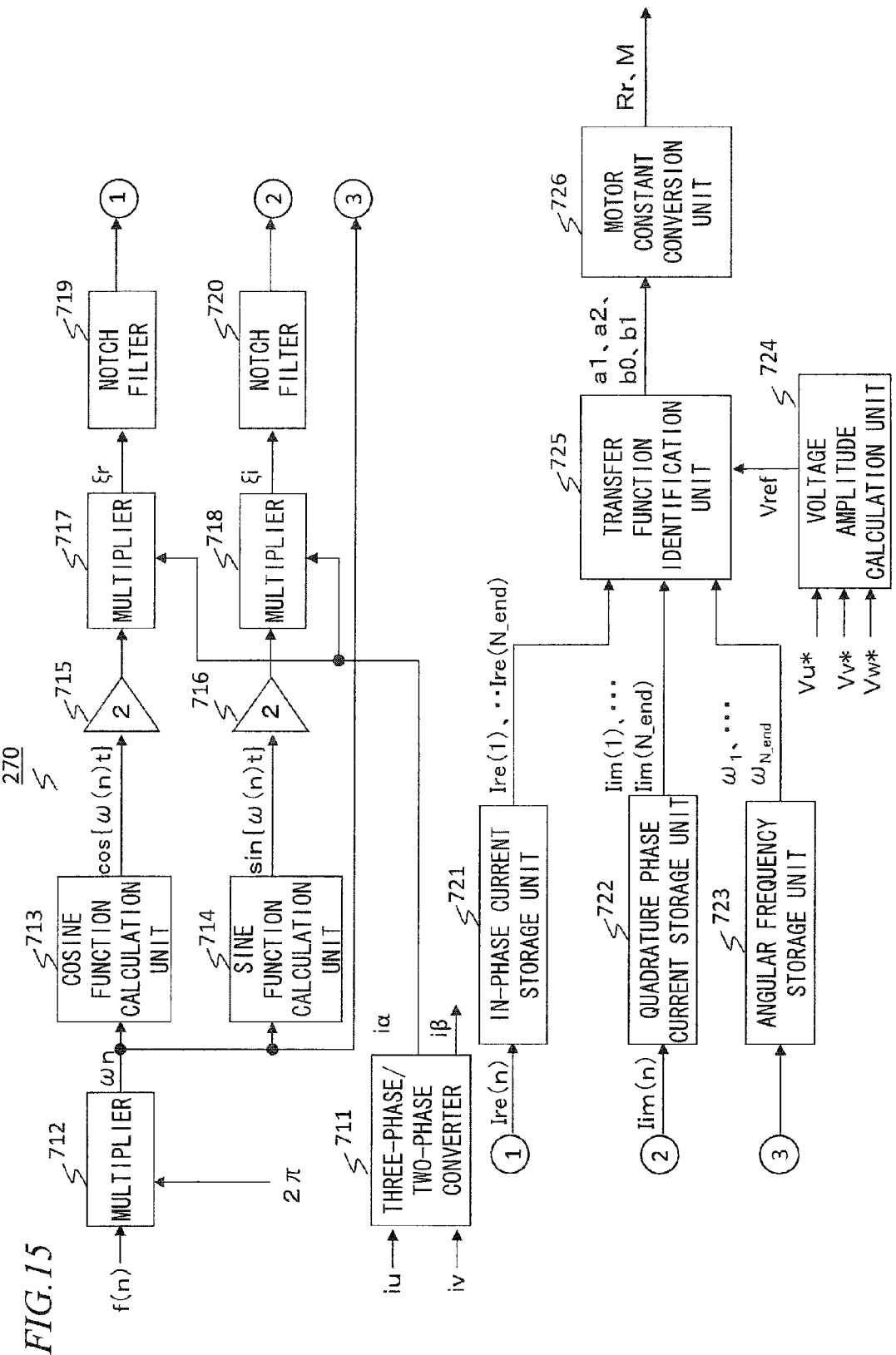
FIG. 15 is a detailed configuration diagram according to the motor control device of embodiment 2 of the present invention.

Hereinafter, embodiment 2 of the present invention will be described based on the drawings. FIG. 11 is a diagram showing the hardware configuration of a motor control device 201 according to embodiment 2 of the present invention, FIG. 12 is a flowchart for explaining a process, FIG. 13 is a configuration diagram, FIG. 14 is a motor equivalent circuit, and FIG. 15 is a detailed configuration diagram. In FIG. 11, components that are the same as or correspond to those in FIG. 1 are denoted by the same reference numerals.

In embodiment 2, a motor constant is calculated as the transfer characteristic of a motor, and the motor type determination about whether the motor is a motor having a secondary circuit or a motor not having a secondary circuit is performed based on the motor constant.

The configuration of the motor control device 201 according to embodiment 2 of the present invention shown in FIG. 11 is only different in a type determination section 207 as compared with the configuration diagram of embodiment 1 shown in FIG. 1, and the other part is the same as in FIG. 1. Accordingly, only the configuration and operation of the type determination section 207 will be described.

The type determination section 207 calculates the motor constant of the motor 2 by assuming that the motor 2 is a motor having a secondary circuit.

In the case of a motor having a secondary circuit, as a result of the motor constant calculation, all the calculated motor constants become positive real numbers. However, in the case of a motor not having a secondary circuit, due to the absence of a secondary circuit, motor constants relevant to a secondary circuit such as secondary resistance, secondary inductance, and mutual inductance between primary inductance and secondary inductance, become values (negative or imaginary number) other than a positive real number. By using the above feature, whether the motor is a motor having a secondary circuit or a motor not having a secondary circuit is determined.

FIG. 12 is a flowchart of a process for determining the motor type according to embodiment 2.

When the process is started (S101), the initial value n=1 is set (S102). Next, in accordance with the count value n (the initial value=1), the frequency instruction f(n) is set (S103).

Next, alternating voltage at the frequency instruction f(n) is applied (S104), and alternating current having the same frequency as that of the alternating voltage is detected from motor current flowing in the motor 2 (S105).

In order to obtain the motor constant of the motor having a secondary circuit by assuming that the motor 2 is a motor having a secondary circuit, in-phase current having the same phase direction as that of the alternating voltage, and quadrature phase current having a quadrature phase direction relative to the alternating voltage are extracted from the alternating current, and then stored (S106).

If the count value n is equal to or smaller than a count maximum value N_end set in advance (S107), the count value is set to be n+1 by adding 1 to the count value n (S108). Thereafter, steps S103 to S106 are repeated until the count value n becomes larger than the count maximum value N_end.

If the count value n is larger than the count maximum value, a transfer function Gim(s) is identified based on the stored in-phase currents and the stored quadrature phase currents by assuming that the motor 2 is a motor having a secondary circuit (S109).

Next, from the identified transfer function Gim(s), the motor constants, i.e., primary resistance Rs, secondary resistance Rr, primary inductance Ls, secondary inductance Lr, and mutual inductance M are calculated (S110).

In the case where the motor 2 is a motor not having a secondary circuit, among the calculated motor constants, the secondary resistance Rr and the mutual inductance M which are motor constants relevant to a secondary circuit become values other than a positive real number. Therefore, if the secondary resistance Rr and the mutual inductance M are positive real numbers, the motor 2 is determined to be a motor having a secondary circuit, and if they are not positive real numbers, the motor 2 is determined to be a motor not having a secondary circuit.

It is noted that secondary inductance Lr is also a motor constant relevant to a secondary circuit. However, since the primary inductance Ls=the secondary inductance Lr is assumed in the calculation, the secondary inductance Lr becomes a positive real number even in a motor not having a secondary circuit, as a result of the motor constant calculation. Therefore, only the secondary resistance Rr and the mutual inductance M are used to determine the motor type.

Hereinafter, the flowchart in FIG. 12 will be further described.

In a process from the setting of the frequency instruction f(n) (S103) to the detection of the alternating current (S105) in FIG. 12, similarly to embodiment 1, the frequency instruction setting section 6 sets the frequency instruction fn in accordance with the count value n (the initial value=1). The AC voltage instruction generation section 5 performs two-phase/three-phase conversion for an α-axis voltage instruction Vα=Vref·cos(ωn·t) and a β-axis voltage instruction Vβ=0 on two axes at rest, by expression (1), thereby generating an AC voltage instruction. Based on the AC voltage instruction, the voltage application section 4 applies the alternating voltage to the motor 2. Then, the current detection section 3 detects motor currents iu and iv.

The alternating current detection (S105) and the subsequent steps in the flowchart in FIG. 12 correspond to the processing by the type determination section 207 in FIG. 11 of embodiment 2.

FIG. 13 is a configuration diagram of the type determination section 207, and FIG. 15 shows a detailed configuration diagram of a motor constant calculation section 270 of the type determination section 207.

A process from the alternating current detection (S105) to the motor constant calculation (S110) in the flowchart in FIG. 12 is a process for calculating the motor constants by assuming that the motor 2 is a motor having a secondary circuit. This process corresponds to the motor constant calculation section 270 in FIG. 13. In step 111, it is determined whether or not the secondary resistance Rr and the mutual inductance M are positive real numbers.

First, the motor constant calculation section 270 of the type determination section 207 will be described.

FIG. 14 is an equivalent circuit for one phase of an induction motor which is a motor having a secondary circuit in a stopped state. From FIG. 14, the transfer function Gim(s) from input voltage Vs to output current is can be represented by expression (5). By using coefficients a1, a2, b0, and b1, expression (5) can be represented by expression (6).

[Expression 5]

$$Gim(s) = \frac{1}{R_s} \frac{\frac{L_r}{R_r}s+1}{\frac{L_s}{R_s}\frac{L_r}{R_r}s^2 + \left(\frac{L_s}{R_s} + \frac{L_r}{R_r}\right)s+1} \quad (5)$$

[Expression 6]

$$Gim(s) = \frac{b_0 + b_1 s}{a_2 s^2 + a_1 s + 1} \quad (6)$$

It is noted that the meanings of symbols in FIG. 14 and expressions (5) and (6) are as follows.

M: mutual inductance, ls: primary leakage inductance, l: secondary leakage inductance Rs: primary resistance, Ls: primary inductance (=ls+M)

Rr secondary resistance, Lr: secondary inductance (=lr+M)

s: Laplace operator

In order to calculate the motor constant by assuming that the motor 2 is a motor having a secondary circuit, the motor constant calculation section 270 identifies the transfer function Gim(s) of the motor having a secondary circuit represented by expression (6), thereby obtaining the coefficients a1, a2, b0, and b1. From the obtained coefficients a1, a2, b0, and b1, the motor constants are calculated by expressions (7) to (10).

It is noted that normally, the primary inductance Ls and the secondary inductance Lr are close to each other. Therefore, Ls=Lr is assumed upon the calculation of the motor constants from the coefficients a1, a2, b0, and b1.

[Expression 7]

$$R_s = \frac{1}{b_0} \quad (7)$$

[Expression 8]

$$R_r = \frac{a_1 b_0 - b_1}{b_0 b_1} \quad (8)$$

[Expression 9]

$$M = \sqrt{\frac{(a_1 b_0 - b_1)^2}{b_0^4} - \frac{a_2(a_1 b_0 - b_1)}{b_0^2 b_1}} \quad (9)$$

[Expression 10]

$$L_s = L_r = \frac{a_1 b_0 - b_1}{b_0^2} \quad (10)$$

FIG. 15 is a detailed configuration diagram of the motor constant calculation section 270, which is composed of a part for calculating and storing in-phase current and quadrature phase current, and a part for identifying a transfer function.

The above-described alternating voltage based on Vα=Vref·cos(ωn·t) and Vβ=0 is applied, and the current detection section 3 detects motor current. The detected motor currents iu and iv are converted to α-axis current and β-axis current on two axes at rest by expression (11). If the converted α-axis current is denoted by iα and the converted β-axis current is denoted by iβ, iα and iβ can be represented by expression (12). It is noted that in expression (12), Iα is the magnitude of the α-axis current and φ is the phase difference between Vα and iα.

[Expression 11]

$$\begin{bmatrix} i_\alpha \\ i_\beta \end{bmatrix} = \sqrt{2} \begin{bmatrix} \frac{\sqrt{3}}{2} & 0 \\ \frac{1}{2} & 1 \end{bmatrix} \begin{bmatrix} i_u \\ i_v \end{bmatrix} \quad (11)$$

[Expression 12]

$$i_{\alpha s} = I_\alpha \cos(\omega n t + \phi)$$

$$i_{\beta s} = 0 \quad (12)$$

If a transfer function from Vα to iα is denoted by Gα(jωn), the transfer function Gα(jωm) can be represented by expression (13) when the alternating voltage of Vα=Vref·cos(ωn·t) is applied.

[Expression 13]

$$G\alpha(j\omega n) = \text{Re}[G\alpha(j\omega n)] + j\text{Im}[G\alpha(j\omega n)] \quad (13)$$

$$= \left|\frac{I_\alpha}{V_{ref}}\right|\cos\phi + j\left|\frac{I_\alpha}{V_{ref}}\right|\sin\phi$$

In expression (13), |Iα/Vref|cos φ is referred to as in-phase current, and |Iα/Vref|sin φ is referred to as quadrature phase current. In the part for calculating and storing the in-phase current and the quadrature phase current in FIG. 15, the above in-phase current and quadrature phase current are calculated.

In expression (13), since Vref is a known value, the transfer function Gα(jωn) can be obtained by calculating the in-phase current |Iα|cos φ and the quadrature phase current |Iα|sin φ.

Next, a method for calculating the in-phase current |Iα|cos φ and the quadrature phase current |Iα|sin φ will be described. A cosine function 2 cos(ωn·t) and a sine function 2 sin(ωn·t) are prepared, and then values obtained by multiplying iα by the cosine function and the sine function are denoted by ξr and ξi, respectively. Then, ξr and ξi are represented by expressions (14) and (15), respectively.

[Expression 14]

$$\xi_r = i_\alpha \cdot 2\cos\omega n t \quad (14)$$

$$= |I_\alpha|\cos(\omega n t + \phi) \cdot 2\cos\omega n t$$

$$= |I_\alpha|\{\cos(2\omega n t + \phi) + \cos\phi\}$$

[Expression 15]

$$\xi_i = i_\alpha \cdot 2\sin\omega n t \quad (15)$$

$$= |I_\alpha|\cos(\omega n t + \phi) \cdot 2\sin\omega n t$$

$$= |I_\alpha|\{\sin(2\omega n t + \phi) + \sin\phi\}$$

As is obvious from expressions (14) and (15), ξr and ξi are composed of an AC component having an angular frequency of 2ωn and a DC component of |Iα|·cos φ or |Iα|·sin φ. Therefore, by removing the angular frequency component of 2ωn from ξr and ξi, the in-phase current |Iα|cos φ and the quadrature phase current |Iα|sin φ can be obtained.

In embodiment 2, in order to remove the angular frequency component of 2ωn from ξr and ξi, a notch filter represented by expression (16) is applied, thereby obtaining the in-phase current |Iα|cos φ and the quadrature phase current |Iα|sin φ as shown by expressions (17) and (18).

Here, the notch filter is used for extracting only a necessary signal. Specifically, the notch filter is a filter for causing the gain for a frequency of a narrow band signal to be 0, and causing the gain for the other frequencies to be 1.

It is noted that the in-phase current $|I\alpha|\cos\phi$ and the quadrature phase current $|I\alpha|\sin\phi$ at the count value n are denoted by Ire(n) and Iim(n), respectively.

[Expression 16]

$$\frac{s^2 + (2\omega n)^2}{s^2 + \frac{2\omega n}{q_n}s + (2\omega n)^2} \quad (16)$$

[Expression 17]

$$|I_\alpha|\cos\varphi = \frac{s^2 + (2\omega n)^2}{s^2 + \frac{2\omega n}{q_n}s + (2\omega n)^2}\xi_r \quad (17)$$

$$= I_{re}(n)$$

[Expression 18]

$$|I_\alpha|\sin\varphi = \frac{s^2 + (2\omega n)^2}{s^2 + \frac{2\omega n}{q_n}s + (2\omega n)^2}\xi_i \quad (18)$$

$$= I_{im}(n)$$

In order to thus calculate Ire(n) and Iim(n), in the part for calculating and storing the in-phase current and the quadrature phase current in FIG. 15, a three-phase/two-phase converter 711 converts iu and iv detected by the current detection section 3 to iα and iβ.

A multiplier 712 multiplies the frequency instruction f(n) at the count value n outputted by the frequency instruction setting section 6 by 2π, thereby outputting the angular frequency instruction ωn. A cosine function calculation unit 713 outputs a cosine function cos ωnt of the angular frequency con, and a sine function calculation unit 714 outputs a sine function sin ωnt of the angular frequency ωn.

Proportion units 715 and 716 double the cosine function cos ωnt outputted by the cosine function calculation unit 713 and the sine function sin ωnt outputted by the sine function calculation unit 714, thereby outputting 2 cos ωnt and 2 sin ωnt, respectively. Multipliers 717 and 718 multiply 2 cos ωnt and 2 sin ωnt outputted by the proportion units 715 and 716 by is outputted by the three-phase/two-phase converter 711, thereby outputting ξr and ξi in expressions (14) and (15), respectively.

Notch filters 719 and 720 apply notch filters to ξr and ξi outputted by the multipliers 717 and 718, respectively, thereby outputting the in-phase current Ire(n) and the quadrature phase current Iim(n) in expressions (17) and (18) at the count value n, respectively.

In addition, if the count value n is equal to or smaller than N_end, an in-phase current storage unit 721 stores the in-phase current Ire(n). If the count value n has become larger than N_end, the in-phase current storage unit 721 outputs the stored in-phase currents Ire(1) to Ire(N_end) as in-phase current stored values.

If the count value n is equal to or smaller than N_end, a quadrature phase current storage unit 722 stores the quadrature phase current Iim(n). If the count value n has become larger than N_end, the quadrature phase current storage unit 722 outputs the stored quadrature phase currents Iim(1) to Iim(N_end) as quadrature phase current stored values.

If the count value n is equal to or smaller than N_end, an angular frequency storage unit 723 stores the angular frequency ωn at the count value n. If the count value n has become larger than N_end, the angular frequency storage unit 723 outputs the angular frequencies ω1 to ωN_end as angular frequency stored values.

Next, a transfer function identification unit 725 will be described. When the alternating voltage Vα=Vref·cos(ωn·t) having the angular frequency ωn is applied, the transfer function from Vα to iα can be represented by expression (19) using the above-described in-phase current Ire(n) and quadrature phase current Iim(n). Here, the transfer function in expression (19) is denoted by H(jωn).

[Expression 19]

$$H(j\omega n) = \sum_{n=1}^{N\_end}\left[\frac{I_{re}(n)}{V_{ref}} + j\frac{I_{im}(n)}{V_{ref}}\right] \quad (19)$$

$$= \frac{I_{re}(1)}{V_{ref}} + j\frac{I_{im}(1)}{V_{ref}} + \ldots + \frac{I_{re}(N\_end)}{V_{ref}} + j\frac{I_{im}(N\_end)}{V_{ref}}$$

$$= \sum_{n=1}^{N\_end}[X_{re}(n) + jX_{im}(n)]$$

In addition, if the denominator and the numerator of the transfer function Gim(s) of a motor having a secondary circuit in expression (5) are denoted by A(s) and B(s) and defined by expressions (20) and (21), respectively, Gim(s) is represented by expression (22). In addition, if the Laplace operator s in expression (22) is substituted by jωn, expression (22) can be represented by expression (23).

[Expression 20]

$$A(s) = 1 + a_1 s + a_2 s^2 \quad (20)$$

[Expression 21]

$$B(s) = b_0 + b_1 s \quad (21)$$

[Expression 22]

$$Gim(s) = \frac{B(s)}{A(s)} \quad (22)$$

[Expression 23]

$$Gim(j\omega n) = \frac{B(j\omega n)}{A(j\omega n)} \quad (23)$$

As described above, in embodiment 2, since the motor constants are calculated by assuming that the motor 2 is a motor having a secondary circuit, the transfer function H(jωn) in expression (19) is assumed to be equal to the transfer function Gim(jωn) of a motor having a secondary circuit in expression (23). That is, a relationship shown by expression (24) is obtained.

[Expression 24]

$$H(j\omega n) = \frac{B(j\omega n)}{A(j\omega n)} \quad (24)$$

Here, ϵ(n) is defined by expression (25). From expression (24), ideally, ϵ(n) in expression (25) becomes zero. Then, by applying a least squares method, unknown coefficients a1, a2, b0, and b1 are calculated so as to minimize expression (26).

[Expression 25]

$$\varepsilon(n) = H(j\omega n)A(j\omega n) - B(j\omega n) \qquad (25)$$
$$= X_{re}(n) + jX_{im}(n) + \{j\omega n X_{re}(n) - \omega n X_{im}(n)\}a_1 +$$
$$\{-\omega n^2 X_{re}(n) - j\omega n^2 X_{im}(n)\}a_2 - b_0 - j\omega n b_1$$
$$= -\omega n X_{im}(n)a_1 - \omega n^2 X_{re}(n)a_2 - b_0 + X_{re}(n) +$$
$$j\{\omega n X_{re}(n)a_1 - \omega n^2 X_{im}(n)a_2 - \omega n b_1 X_{im}(n)\}$$

[Expression 26]

$$\sum_{n=1}^{N\_end} |\varepsilon(n)|^2 = \sum_{n=1}^{N\_end} |H(j\omega n)A(j\omega n) - B(j\omega n)|^2 \qquad (26)$$

Next, a method for obtaining expression (26) will be described.

If $\epsilon$ is defined by expression (27), there is a relationship shown by expression (28) between $\epsilon$ and $\epsilon T$ which is the transposed matrix of $\epsilon$.

[Expression 27]

$$\epsilon = [\epsilon(1) + \epsilon(2) + \ldots \epsilon(N\_end)]^T \qquad (27)$$

[Expression 28]

$$\epsilon^T \epsilon = \epsilon(1)^2 + \epsilon(2)^2 + \ldots \epsilon(N\_end)^2 \qquad (28)$$

Here, if $\epsilon'$ is defined by expression (29), the function of expression (26) can be obtained from expressions (28) and (29), as shown by expression (30).

[Expression 29]

$$\varepsilon' = [\text{Re}(\varepsilon(1))\ \text{Im}(\varepsilon(1))\ \ldots\ \text{Re}(\varepsilon(N\_end))\ \text{Im}(\varepsilon(N\_end))]^T \qquad (29)$$

$$= \begin{bmatrix} \omega_1 X_{im}(1) & -\omega_1^2 X_{re}(1) & -1 & 0 \\ \omega_1 X_{re}(1) & -\omega_1^2 X_{im}(1) & 0 & -\omega_1 \\ \vdots & \vdots & \vdots & \vdots \\ \omega_1 X_{im}(N\_end) & -\omega_1^2 X_{re}(N\_end) & -1 & 0 \\ \omega_1 X_{re}(N\_end) & -\omega_1^2 X_{im}(N\_end) & 0 & -\omega_{N\_end} \end{bmatrix} \begin{bmatrix} a_1 \\ a_2 \\ b_0 \\ b_1 \end{bmatrix} - \begin{bmatrix} -X_{re}(1) \\ -X_{im}(1) \\ \vdots \\ -X_{re}(N\_end) \\ -X_{im}(N\_end) \end{bmatrix}$$

[Expression 30]

$$\varepsilon'^T \varepsilon' = \{\text{Re}(\varepsilon(1))\}^2 + \{\text{Im}(\varepsilon(1))\}^2 + \ldots + \{\text{Re}(\varepsilon(N\_end))\}^2 + \qquad (30)$$
$$\{\text{Im}(\varepsilon(N\_end))\}^2$$
$$= \sum_{n=1}^{N\_end} |H(j\omega n)A(j\omega n) - B(j\omega n)|^2$$

When N_end>2, by applying a least squares method, the coefficients a1, a2, b0, and b1 that minimize expression (30) can be obtained as shown by expression (31).

[Expression 31]

$$\begin{bmatrix} a_1 \\ a_2 \\ b_0 \\ b_1 \end{bmatrix} = (A_1^T A_1)^{-1} A_1^T b_1 \qquad (31)$$

Here, $$A_1 = \begin{bmatrix} \omega_1 X_{im}(1) & -\omega_1^2 X_{re}(1) & -1 & 0 \\ \omega_1 X_{re}(1) & -\omega_1^2 X_{im}(1) & 0 & -\omega_1 \\ \vdots & \vdots & \vdots & \vdots \\ \omega_1 X_{im}(N\_end) & -\omega_1^2 X_{re}(N\_end) & -1 & 0 \\ \omega_1 X_{re}(N\_end) & -\omega_1^2 X_{im}(N\_end) & 0 & -\omega_{N\_end} \end{bmatrix}$$

$$b_1 = \begin{bmatrix} -X_{re}(1) \\ -X_{im}(1) \\ \vdots \\ -X_{re}(N\_end) \\ -X_{im}(N\_end) \end{bmatrix}$$

If the count value has become larger than N_end as described above, the transfer function identification unit 725 in FIG. 15 performs calculation of expressions (19) and (29) to (31) by using the in-phase current stored values and the quadrature phase current stored values outputted by the in-phase current storage unit 721, and the angular frequency stored values outputted by the angular frequency storage unit 723, thereby obtaining the coefficients a1, a2, b0, and b1.

It is noted that, for Vref in expression (19), Vref calculated from expression (3) by a voltage amplitude calculation unit 724 is used.

In addition, as described in embodiment 1, Vref may be obtained directly from the AC voltage instruction generation section 5 in FIG. 11. In this case, the voltage amplitude calculation unit 724 is not needed.

A motor constant conversion unit 726 calculates the motor constants, i.e., the primary resistance Rs, the secondary resistance Rr, the primary inductance Ls (=secondary inductance Lr), and the mutual inductance M, from the coefficients a1, a2, b0, and b1 outputted by the transfer function identification unit 725, by using expressions (7) to (10). Of these values, the motor constant conversion unit 726 outputs the secondary resistance Rr and the mutual inductance M to be used for the motor type determination.

The motor constant calculation section 270 in FIG. 13 outputs, to a motor type determination unit 271, the secondary resistance Rr and the mutual inductance M outputted by the motor constant conversion unit 726.

The motor type determination unit 271 in FIG. 13 determines the type of the motor from the secondary resistance Rr and the mutual inductance M outputted by the motor constant calculation section 270.

If both the secondary resistance Rr and the mutual inductance M are positive real numbers, the motor type determination unit 271 determines the motor to be a motor having a secondary circuit, and if both are not positive real numbers, the motor type determination unit 271 determines the motor to be a motor not having a secondary circuit. Then, the motor type determination unit 271 outputs the determined type of the motor.

It is noted that in the case where the motor 2 is an induction motor or a permanent magnet synchronous motor, if both the secondary resistance Rr and the mutual inductance M are positive real numbers, the motor 2 can be determined to be an induction motor, and if not, the motor 2 can be determined to be a permanent magnet synchronous motor.

As described above, the motor control device 201 according to embodiment 2 calculates the motor constants as the transfer characteristic of the motor 2, and determines the type of the motor from the motor constants.

The motor control device 201 applies alternating voltage set based on a plurality of different frequency instructions, to the motor 2, and then identifies the transfer function of the motor 2 from the alternating current flowing in the motor 2 and the alternating voltage, by assuming that the motor 2 is a motor having a secondary circuit. From the identified transfer function, the motor control device 201 calculates motor constants as the transfer characteristic of the motor 2. Of the calculated motor constants, if both the secondary resistance Rr and the mutual inductance M relevant to a secondary circuit are positive real numbers, the motor control device 201 determines the motor to be a motor having a secondary circuit, and if not, determines the motor to be a motor not having a secondary circuit. Therefore, since the motor control device 201 according to embodiment 2 determines whether the motor is a motor having a secondary circuit or a motor not having a secondary circuit without using magnetic saturation of the motor, the motor control device 201 provides an effect of improving the determination accuracy.

INDUSTRIAL APPLICABILITY

The present invention relates to a control device for a motor, and more particularly, to a control device for a motor having means for determining the type of a motor that is a control target by using the transfer characteristic of the motor, and is widely applicable to a control device for an AC motor.

The invention claimed is:

1. A motor control device, comprising:
   a frequency instruction setting section for sequentially outputting a plurality of frequency instructions having different frequencies;
   an AC voltage instruction generation section for generating and outputting a plurality of AC voltage instructions based on the plurality of frequency instructions;
   a voltage application section for applying AC voltage to a motor based on the plurality of AC voltage instructions;
   a current detection section for detecting a plurality of motor currents flowing in the motor in response to the plurality of AC voltage instructions; and
   a type determination section for determining the type of the motor,
   wherein the type determination section calculates a ratio between the magnitude of the motor current and the magnitude of the AC voltage instruction according to each of the plurality of frequency instructions, and determines the type of the motor based on change in the calculated ratios based on the plurality of frequency instructions having the different frequencies.

2. The motor control device according to claim 1, wherein the type determination section:
   calculates the slope of a gain, based on: a k-th frequency instruction value f(k)(2≤k≤n) sequentially outputted by the frequency instruction setting section; the ratio between the magnitude of the motor current and the magnitude of the AC voltage instruction obtained when the frequency instruction value f(k) is set; a (k−1)-th frequency instruction value f(k−1) sequentially outputted by the frequency instruction setting section; and the ratio between the magnitude of the motor current and the magnitude of the AC voltage instruction obtained when the frequency instruction value f(k−1) is set,
   obtains a point at which the slope of the gain changes, and determines the type of the motor based on the number of the changing points of the slope of the gain.

3. The motor control device according to claim 1, wherein the type determination section identifies a transfer function of the motor from the magnitudes of the plurality of motor currents and the magnitudes of the plurality of AC voltage instructions according to the plurality of frequency instructions, and determines the type of the motor based on a difference of a motor constant value calculated from the transfer function.

4. The motor control device according to claim 3, wherein the transfer function is identified by assuming that the motor has a secondary circuit, and the type determination section determines the type of the motor from secondary resistance and mutual inductance which are the motor constants calculated from the transfer function.

* * * * *